(12) United States Patent
Yang

(10) Patent No.: US 9,740,230 B1
(45) Date of Patent: Aug. 22, 2017

(54) VOLTAGE-ADJUSTING DEVICE AND RELATED VOLTAGE-ADJUSTING METHOD

(71) Applicant: Semiconductor Manufacturing International (Shanghai) Corporation, Shanghai (CN)

(72) Inventor: Chia-Chi Yang, Shanghai (CN)

(73) Assignee: SEMICONDUCTOR MANUFACTURING INTERNATIONAL (SHANGHAI) CORPORATION, Shanghai (CN)

( * ) Notice: Subject to any disclaimer, the term of this patent is extended or adjusted under 35 U.S.C. 154(b) by 0 days.

(21) Appl. No.: 15/190,179

(22) Filed: Jun. 23, 2016

(51) Int. Cl.
    *G05F 3/24* (2006.01)
    *H02J 13/00* (2006.01)

(52) U.S. Cl.
    CPC .............. *G05F 3/24* (2013.01); *H02J 13/00* (2013.01)

(58) Field of Classification Search
    CPC ................................. G05F 1/465; G05F 1/577
    See application file for complete search history.

(56) References Cited

U.S. PATENT DOCUMENTS

| | | | | |
|---|---|---|---|---|
| 3,729,671 A | * | 4/1973 | Jeffery | H02M 3/00 361/18 |
| 5,747,974 A | * | 5/1998 | Jeon | G05F 1/465 323/269 |
| 7,023,672 B2 | | 4/2006 | Goodfellow et al. | |
| 8,294,429 B2 | | 10/2012 | Fuller et al. | |
| 8,749,299 B2 | * | 6/2014 | Han | G05F 1/465 327/536 |

* cited by examiner

Primary Examiner — Jeffrey Zweizig
(74) Attorney, Agent, or Firm — Anova Law Group, PLLC

(57) ABSTRACT

A voltage-adjusting device is provided for adjusting voltages of one or more power domains in a chip. The device includes a distributing system, and a voltage-adjusting system. The distributing system obtains task information for the one or more power domains, obtains a forecasted voltage and a detected voltage for a power domain, and obtains a control system for the power domain for controlling a voltage applied on the power domain based on the forecasted voltage and the detected voltage. The forecasted voltage is a voltage required for the power domain to execute a task. Further, the voltage-adjusting system is connected to the distributing system and the one or more power domains, adjusts the voltage applied on the power domain based on the control signal such that the detected voltage reaches the forecasted voltage when the power domain executes a task.

20 Claims, 5 Drawing Sheets

VOLTAGE-ADJUSTING DEVICE AND RELATED VOLTAGE-ADJUSTING METHOD

FIELD OF THE DISCLOSURE

The present disclosure generally relates to the field of semiconductor technology and, more particularly, relates to a voltage-adjusting device and a related voltage-adjusting method.

BACKGROUND

In conventional system on chip (SOC) designs, a plurality of voltage-adjusting devices is required to provide different voltages to different power domains.

FIG. 1 illustrates the structure of a conventional voltage-adjusting device. The voltage-adjusting device 1 often includes a reference circuit 11, a comparator 12, a driving unit 13, and a feedback unit 14. The two input terminals of the comparator 12 are connected to the output terminal of the reference circuit 11 and the output terminal of the feedback unit 14, respectively. The output terminal of the comparator 12 is connected to the input terminal of the driving unit 13. The output terminal of the driving unit 13 is connected to the input terminal of the feedback unit 14 and the load unit 2.

FIG. 2 illustrates the circuit diagram of the voltage-adjusting device 1 shown in FIG. 1.

As shown in FIG. 2, the driving unit 13 includes a PMOS transistor M1. The feedback unit 14 includes a plurality of resistors, e.g., R1 and R2, connected in series. The feedback unit 14 divides the voltage applied thereon and sends a divided voltage to the comparator 12 as a feedback voltage $V_{fb}$. The comparator 12 compares the feedback voltage $V_{fb}$ and a reference voltage $V_{ref}$ generated by the reference circuit 11. The result of comparison, generated by the comparator 12 is used to determine whether the driving unit 13 is turned on or turned off. When the feedback voltage $V_{fb}$ and the reference voltage $V_{ref}$ are different, the comparator 12 controls the driving unit 13 to be turned on and change the feedback voltage $V_{ref}$. A plurality of feedback processes may be performed until the feedback voltage $V_{fb}$ and the reference voltage $V_{ref}$ are equal to each other. Then, a stable output voltage $V_{out}$ may be generated. In practice, the reference voltage $V_{ref}$ and the resistors connected in series may be adjusted to obtain a stable output voltage $V_{out}$, where $V_{out}$ is a predetermined voltage value.

Referring to FIG. 2, according to conventional technology, a power gating 21 is often included in the load unit 2. When the load 22 is not in operation, the power gating 21 disconnects the load 22 from the voltage-adjusting device 1 to reduce leakage current. Specifically, the power gating 21 includes a PMOS transistor M2.

However, the conventional voltage-adjusting device often occupies an undesirably large amount of area on the chip. Each power domain that requires voltage-adjusting functions is disposed with a voltage-adjusting device within. Thus, an undesirably large wafer/chip area is needed to dispose a plurality of voltage-adjusting devices.

BRIEF SUMMARY OF THE DISCLOSURE

One aspect of the present disclosure provides a voltage-adjusting device for adjusting voltages of one or more power domains in a chip. The device includes a distributing system, and a voltage-adjusting system. The distributing system obtains task information for the one or more power domains, obtains a forecasted voltage and a detected voltage for a power domain, and obtains a control system for the power domain for controlling a voltage applied on the power domain based on the forecasted voltage and the detected voltage. The forecasted voltage is a voltage required for the power domain to execute a task. Further, the voltage-adjusting system is connected to the distributing system and the one or more power domains, adjusts the voltage applied on the power domain based on the control signal such that the detected voltage reaches the forecasted voltage when the power domain executes a task.

Another aspect of the present disclosure provides a voltage-adjusting method for adjusting voltages applied on a plurality of power domains in a chip. The method includes obtaining a detected voltage of a power domain; obtaining task information of the plurality power domains to obtain a forecasted voltage of the power domain, the forecasted voltage being a voltage required for the power domain to execute a task; obtaining a control signal for the power domain based on the detected voltage and the forecasted voltage; and adjusting the voltage applied on the power domain based on the control signal such that the detected voltage reaches the forecasted voltage when the power domain executes a task.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

It has been found out that, voltage-adjusting devices in conventional technology take up an undesirably large amount of area. The reasons for this issue are now described in connection with the structure of a conventional voltage-adjusting device.

Figure 1:
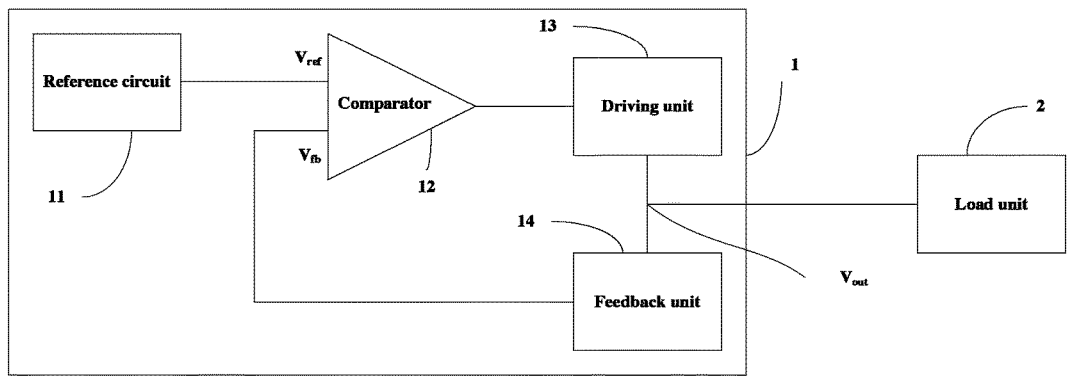
FIG. 1 illustrates a conventional voltage-adjusting device.
Figure 2:
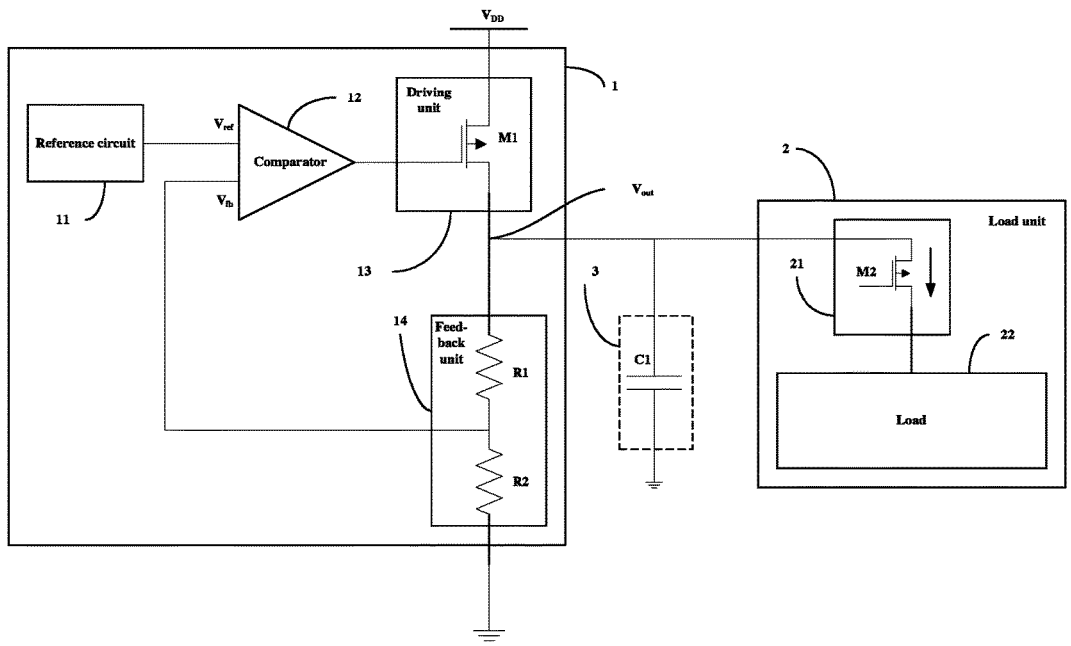
FIG. 2 illustrates a circuit diagram of the voltage-adjusting device illustrated in FIG. 1.

Referring to FIG. 1 and FIG. 2, the formation of a voltage-adjusting device 1 and a power gating 21 requires considerably large areas. The voltage-adjusting device 1 can only be used to adjust the voltage of a single power domain. Different voltage-adjusting devices need to be formed to adjust the voltages of different power domains. Thus, when a chip is being designed, an undesirably large amount of area is required to dispose a plurality of voltage-adjusting devices 1 and power gatings 21. In addition, to avoid the fluctuation of the output voltage $V_{out}$ caused by the change of the load unit 2, a conventional chip often also includes a decoupling capacitor 3 connected to the output terminal that outputs the output voltage $V_{out}$. Because the fluctuation range of the output voltage $V_{out}$ is unknown, the decoupling capacitor 3 often has high capacitance and is often costly. Further, a large amount of decoupling capacitors 3 often needs to be formed. To ensure a stable output voltage $V_{out}$, a decoupling capacitor 3 maintains being charged in operation. When the load unit 2 undergoes changes, the decoupling capacitor 3 can compensate the fluctuation of the output voltage $V_{out}$ in time to prevent malfunctions of the power domains. However, such a configuration results in high power consumption of the voltage-adjusting device 1.

To at least partially solve the issues described above, the present disclosure provides a voltage-adjusting device to adjust the voltages applied on one or more power domains. The voltage-adjusting device may include a distributing system. Based on the task information of each power domain in the chip, the distributing system may obtain a forecasted voltage for a power domain, where the forecasted voltage represents a voltage for the power domain to execute a corresponding task. The distributing system may also detect the operational voltage of each power domain to obtain a detected voltage for each power domain. Further, based on the forecasted voltage and the detected voltage of a power domain, the distributing system may obtain a control signal for the voltage distribution for the power domain. The disclosed voltage-adjusting device may also include a voltage-adjusting system connected to the distributing system and each power domain in the chip. The voltage-adjusting device may adjust the voltage applied on each power domain based on the control signals outputted by the distributing system. The voltage-adjusting system may enable the detected voltage of a power domain to reach the corresponding forecasted voltage.

For illustrative purposes, in the description of the embodiments, the term "a certain voltage of a power domain" or the alike represents the voltage, e.g., a forecasted voltage or a detected voltage, applied on the power domain.

It should be noted that, the disclosed voltage-adjusting device is used to adjust the voltages applied on the power domains in a chip. The chip may include one or more power domains and one or more voltages applied on the power domains. The power domains may include a first power domain, a second power domain, . . . , and an $m^{th}$ power domain, where m represents the number of power domains in the chip.

Figure 3:
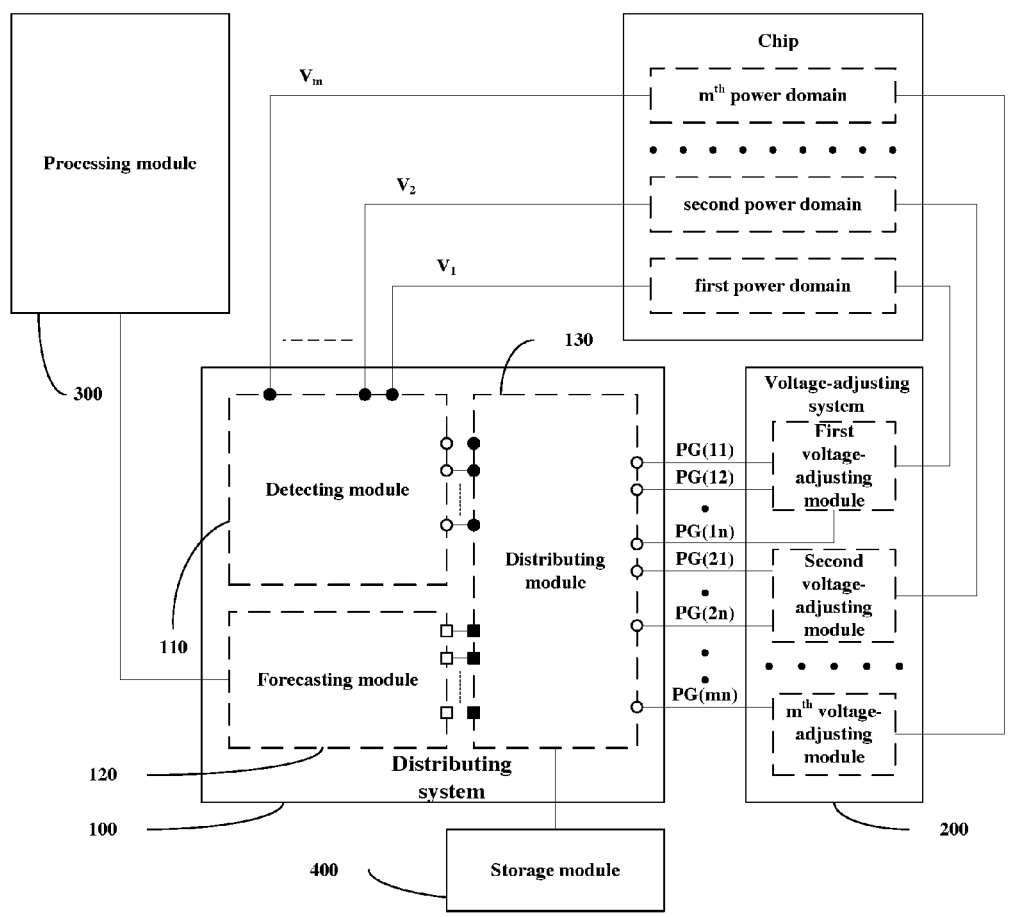
FIG. 3 illustrates an exemplary block diagram of a voltage-adjusting device consistent with various disclosed embodiments of the present disclosure.

Embodiments of the present disclosure is now illustrated in connection with the drawings. FIG. 3 illustrates an exemplary block diagram of the disclosed voltage-adjusting device.

As shown in FIG. 3, the voltage-adjusting device may include a distributing system 100, which may include a detecting module 110, a forecasting module 120, and a distributing module 130. The voltage-adjusting device may also include a voltage-adjusting system 200 that includes one or more voltage-adjusting modules. The voltage-adjusting module may include a first voltage-adjusting module, a second voltage-adjusting module, . . . , and an $m^{th}$ voltage adjusting module. The first voltage-adjusting module may be connected to the first power domain; the second voltage-adjusting module may be connected to the second power domain; . . . ; and the $m^{th}$ voltage-adjusting module may be connected to the $m^{th}$ power domain. In one embodiment, a voltage-adjusting module may include one or more transistors. The distributing system 100 may adjust the power domain voltages through controlling the on and off states of the transistors in each voltage-adjusting modules.

Specifically, based on the task information for each power domain of the chip, the distributing system 100 may be configured to obtain a forecasted voltage for each power domain, which is a required voltage for the power domain to execute a task. The distributing system 100 may also detect an operational voltage of each power domain to obtain a detected voltage for each power domain. The distributing system 100 may obtain a control signal PG for a power domain based on the forecasted voltage and the detected voltage of the power domain.

The control signals inputted to the first voltage-adjusting module may be PG(11), PG(12), . . . , and PG(1n). The control signals inputted to the second voltage-adjusting module may be PG(21), PG(22), . . . , and PG(2n). The control signals inputted to the $m^{th}$ voltage-adjusting module may be PG(m1), PG(m2), . . . , and PG(mn). In one embodiment, n may represent the number of transistors in a voltage-adjusting module. It should be noted that, "n" is only used to indicate a desired number of transistors in a voltage-adjusting module. The actual number of transistors in different voltage-adjusting modules may be the same or may be different.

Further, the distributing system 100 may include a detecting module 110. The detecting module 110 may detect the operational voltage of each power domain to obtain the detected voltage $V_{dect}$ for the corresponding power domain.

Figure 4:
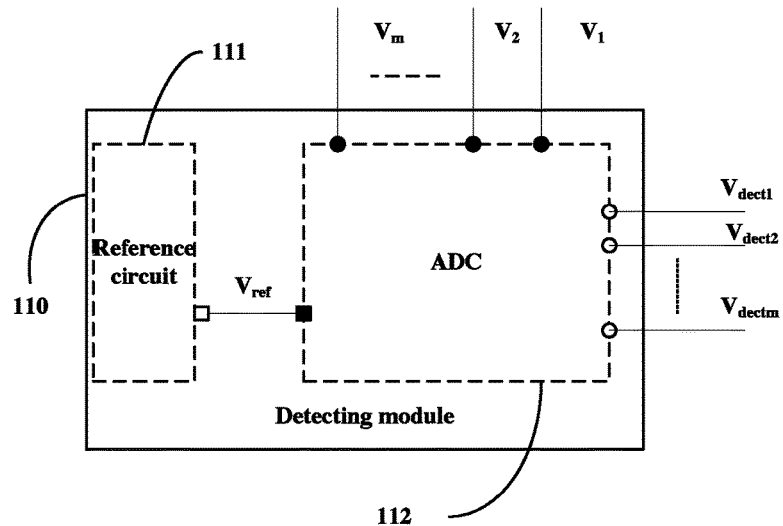
FIG. 4 illustrates an exemplary block diagram of a detecting module consistent with various disclosed embodiments of the present disclosure.

FIG. 4 illustrates an exemplary block diagram of the detecting module 110 shown in FIG. 3.

Specifically, the detecting module 110 may include a reference circuit 111 and an analog-to-digital converter (ADC) 112. The reference circuit 111 may be configured to generate a reference voltage $V_{ref}$. In one embodiment, the reference circuit 111 may be a bandgap voltage reference (Bandgap) circuit. Often, an ideal Bandgap circuit may be a fundamental circuit that provides a stable reference voltage. The reference voltage is independent of temperature and the operating speed of the device. It should be noted that, the Bandgap circuit may only be exemplary. In various embodiments, other suitable circuits may also be used to provide the reference voltage $V_{ref}$.

The ADC 112 may be connected to the reference circuit 111 and the power domains in the chip. In some embodiments, the ADC 112 may be connected to each power domain in the chip. The ADC 112 may be configured to receive the reference voltage $V_{ref}$ provided by the reference circuit 111 and the operational voltages $V_{dect}$ outputted by the power domains. The ADC 112 may compare the operational voltages $V_{dect}$ with the reference voltage $V_{ref}$. The difference between the reference voltage $V_{ref}$ and an operational voltage $V_{dect}$ of a power domain may be the detected voltage $V_{dect}$ for the corresponding power domain. The ADC 112 may output a digital signal, corresponding to the detected voltage $V_{detc}$, to the power domain. The ADC 112 may convert a detected voltage $V_{dect}$ to a digital signal so that digital control parts may be used in subsequent operational steps. Accordingly, less areas are needed for the voltage-adjusting device. Specifically, in one embodiment, the ADC 112 may be a successive approximation register (SAR) ADC. In other embodiments, the ADC 112 may also be other suitable ADCs.

It should be noted that, the operational voltages, outputted by the power domains and received by the ADC 112, may be shown as $V_1, V_2, \ldots,$ and $V_m$ in FIGS. 3 and 4. The detected voltages of the power domains, outputted by the ADC 112 and inputted to the corresponding power domains, may be shown as $V_{dect1}, V_{dect2}, \ldots,$ and $V_{dectm}$.

It should be that, the detecting module 110 may obtain the detected voltages $V_{dect1}, V_{dect2}, \ldots,$ and $V_{dectm}$ under a predetermined frequency.

Referring to FIG. 3, the distributing system 100 may also include a forecasting module 120. The forecasting module 120 may obtain a forecasted voltage for a power domain based on the task information of each power domain. The forecasted voltage may be the voltage required for the power domain to execute a task.

The voltage-adjusting device may further include a processing module 300. The processing module 300 may control the power domains in the chip to execute corresponding tasks.

The processing module 300 may be connected to the forecasting module 120 in the distributing system 100. Based on the task information of each power domain provided by the processing module 300, the forecasting module 120 may obtain a forecasted voltage $V_{exp}$ required by a power domain to execute a task after k periods or k clock cycles.

In one embodiment, system clock timing is used in the voltage-adjusting device. The forecasted voltage $V_{exp}$ for a power domain to execute a task after k periods, as obtained by the forecasting module 120, may represent the voltage required by the power domain to execute a task after k system clock cycles. The forecasting module 120 may obtain the forecasted voltages for different power domains. It should be noted that, the use of system clock timing is only exemplary, and the timing means for the voltage-adjusting device may also be any other suitable devices or mechanisms. The specific types of timing mechanism should not be limited by the embodiments of the present disclosure.

In one embodiment, the chip may include m power domains. The forecasting module 120 may obtain a forecasted voltage $V_{exp}$ for each power domain. The forecasted voltages, obtained by the forecasting module 120 for the m power domains, may be $V_{exp1}, V_{exp2}, \ldots,$ and $V_{expm}$.

Specifically, in one embodiment, the processing module 300 may include a central processing unit (CPU). By using CPU as the control component for the voltage-adjusting device, no additional external processing module is required. Accordingly, less area is needed to form the voltage-adjusting device.

The predetermined frequency the forecasting module 120 uses to obtain the task information of the power domains in the chip may be the same as the predetermined frequency the detecting module uses to obtain the operational voltages of the power domains. The forecasting module 120 may obtain the forecasted voltage required by each power domain to execute a task.

Referring to FIG. 3, the distributing system 100 may also include a distributing module 130. The distributing module 130 may obtain control signals PG distributed to the power domains based on the forecasted voltages $V_{exp}$ ($V_{exp1}, V_{exp2}, \ldots, V_{expm}$) and the detected voltages $V_{dect}$ ($V_{dect1}, V_{dect2}, \ldots, V_{dectm}$) of the power domains.

Further, the disclosed voltage-adjusting module may also include a storage module 400. The storage module may be used to store the ON resistances Ron of transistors of different dimensions used in the voltage-adjusting module and operated under different source-to-drain voltages. The storage module 400 may also be used to store the detected capacitance $C_{dect}$ ($C_{dect1}, C_{dect2}, \ldots, C_{dectm}$) of each power domain, the system frequency f_system of the chip, the operational configuration of the voltage-adjusting module corresponding to each power domain, and other related information.

Figure 5:
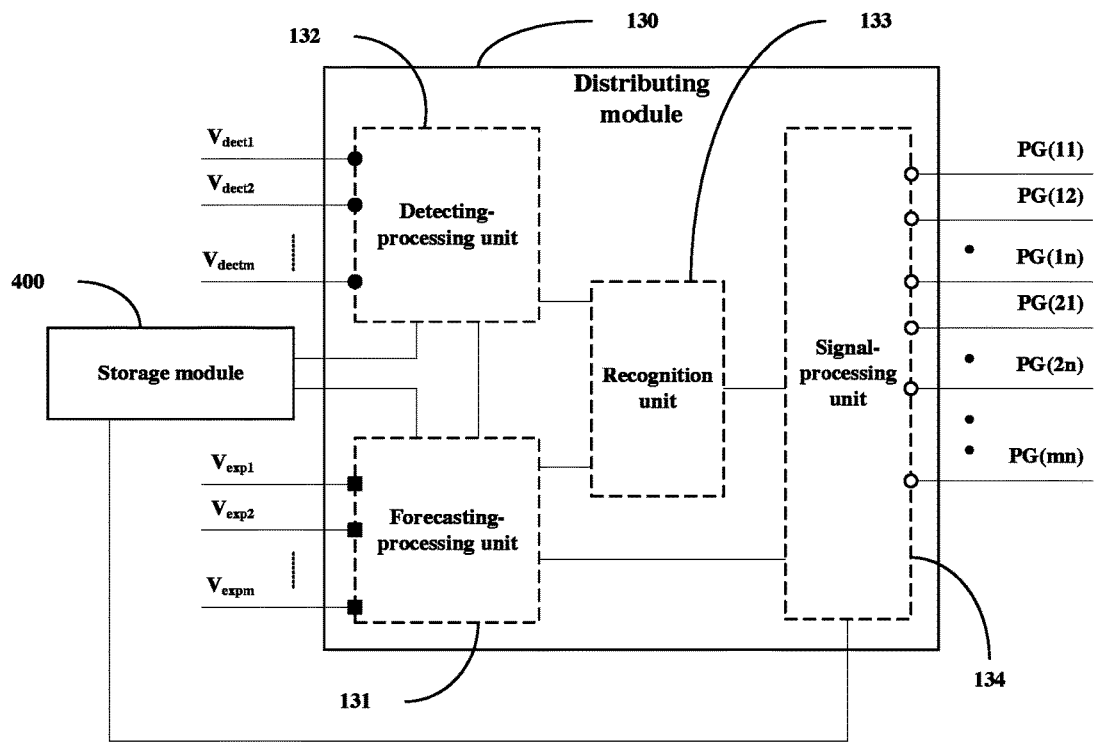
FIG. 5 illustrates an exemplary block diagram of a distributing module consistent with various disclosed embodiments of the present disclosure.

FIG. 5 illustrates an exemplary block diagram of the distributing module 130 illustrated in FIG. 3.

Specifically, the distributing module 130 may include a forecasting-processing unit 131. The forecasting-processing unit 131 may receive the forecasted voltages $V_{exp}$ ($V_{exp1}, V_{exp2}, \ldots, V_{expm}$) obtained by the forecasting module 120. The forecasting-processing unit 131 may also be connected to the storage module 400 to read the ON resistances Ron of different voltage-adjusting modules stored in the storage module 400.

The charges stored in a power domain may be described as equation (1).

$$\Delta Q = Cdect \times \Delta V = Cdect \times (V\exp - Vdect) \qquad (1)$$
$$= \Delta I \times t = \left( \sum \frac{V\exp}{\text{Ron\_exp}} - \sum \frac{Vdect}{\text{Ron\_dect}} \right) \times \frac{k}{\text{f\_system}}$$

In equation (1), $C_{dect}$ may represent a detected capacitance of the power domain; $V_{exp}$ may represent the forecasted voltage of the power domain; $V_{dect}$ may represent the detected voltage of the power domain; Ron_exp may represent the ON resistance of the voltage-adjusting module corresponding to the power domain when the power domain reaches the forecasted voltage $V_{exp}$; Ron_dect may represent the ON resistance of the voltage-adjusting module corresponding to the power domain when the power domain is operated under the detected voltage $V_{dect}$; f_system may represent the frequency of the system clock; k may represent k system clock cycles. The forecasted voltage $V_{exp}$ may represent the voltage required for the power domain to execute a task after k system clock cycles.

According to equation (1), when the detected voltage $V_{dect}$ of a power domain reaches the forecasted voltage $V_{exp}$, the relationship among certain variables associated to a power domain may be described in equation (2).

$$\sum \frac{V\exp}{\text{Ron\_exp}} = Cdect \times \frac{V\exp - Vdect}{k/\text{f\_system}} + \sum \frac{Vdect}{\text{Ron\_dect}} \qquad (2)$$

Thus, the distributing module 130 may include the forecasting-processing unit 131. Based on the forecasted voltage $V_{exp}$ of each power domain, the forecasting-processing unit 131 may obtain the operational configuration of the voltage-adjusting module corresponding to each power domain when the power domain is operated under the corresponding forecasted voltage $V_{exp}$. That is, the forecasting-processing unit 131 may obtain the number of transistors that need to be turned on when a power domain is operated under the corresponding forecasted voltage $V_{exp}$. The forecasting-processing unit 131 may also obtain the ON resistance Ron_exp of each voltage-adjusting module when the voltage-adjusting module is operated under the forecasted voltage $V_{exp}$, based on the forecasted voltage $V_{exp}$, of the corresponding power domain. The forecasting-processing unit 131 may further obtain the forecasted current $I_{exp}$ for each power domain. The forecasted current $I_{exp}$ may be calculated as Iexp=Σ(Vexp/Ron_exp).

The distributing module 130 may further include a detecting-processing unit 132. The detecting-processing unit 132 may be connected to the detecting module 110 to receive the detected voltages $V_{dect}$ ($V_{dect1}$, $V_{dect2}$, ... $V_{dectm}$) obtained by the detecting module 110. The detecting-processing unit 132 may be connected to the storage module 400 to read out the ON resistances Ron_dect of different voltage-adjusting modules stored in the storage module 400. The detecting-processing module 132 may also read out the detected capacitance $C_{dect}$ ($C_{dect1}$, $C_{dect2}$, ..., $C_{dectm}$) of each power domain stored in the storage module 400. The detecting-processing unit 132 may also read out the system frequency f_system of the chip and the operational configuration of the voltage-adjusting module corresponding to each power domain. The operational configuration of a voltage-adjusting module may refer to the number of transistors that are turned on when a power domain is operated under the detected voltage $V_{dect}$. For each power domain, the detecting-processing unit 132 may obtain a detected current for each power domain based on the detected voltage $V_{dect}$, the detected capacitance $C_{dect}$, the operational configuration of the corresponding voltage-adjusting module, and the system frequency f_system of the chip. The detected current $I_{dect}$ may be calculated as Idect=[Cdect×(Vexp−Vdect)/(k/f_system)]+(Vdect/Ron_dect).

Referring to FIG. 5, the distributing module 130 may further include a recognition unit 133. The recognition unit 133 may be connected to the forecasting-processing unit 131 and the detecting-processing unit 132. The recognition unit 133 may receive the forecasted current $I_{exp}$ of a power domain obtained by the forecasting-processing unit 131 and the detected current $I_{dect}$ of the same power domain obtain by the detecting-processing unit 132, to determine if the detected voltage $V_{dect}$ of a power domain equals the forecasted voltage $V_{exp}$ of the power domain when the power domain is executing a task.

Specifically, the recognition unit 133 may compare the detected current $I_{deCt}$ and the forecasted current $I_{exp}$ of each power domain. If the detected current $I_{dect}$ is equal to the forecasted current $I_{exp}$ of the same power domain, the recognition unit 133 may determine that under the current operational configuration, the voltage-adjusting module corresponding to the power domain may reach the forecasted voltage $V_{exp}$. In this case, the operational configuration of the voltage-adjusting module does not need to be changed. The disclosed voltage-adjusting device may start the voltage-adjusting process for the next cycle.

If the detected current $I_{dect}$ is not equal to the forecasted current $I_{exp}$ of the same power domain, the recognition unit 133 may determine that under the current operational configuration, the voltage-adjusting module corresponding to the power domain may not reach the forecasted voltage $V_{exp}$. The operational configuration of the voltage-adjusting module may need to be changed. When the detected current $I_{dect}$ is lower than the forecasted current $I_{exp}$, the detected voltage $V_{dect}$ may be lower than the forecasted voltage $V_{exp}$ of the same power domain. In this case, more transistors in the corresponding voltage-adjusting module may need to be turned on. When the detected current $I_{dect}$ is higher than the forecasted current $I_{exp}$ of the same power domain, the detected voltage $V_{dect}$ may be higher than the forecasted voltage $V_{exp}$. In this case, the number of turned-on transistors in the corresponding voltage-adjusting module may need to be reduced.

The detected current $I_{dect}$ and the forecasted current $I_{exp}$ may be determined based on the corresponding detected voltage $V_{dect}$ and the corresponding forecasted voltage $V_{exp}$, respectively. The detected current $I_{dect}$ and the forecasted current $I_{exp}$ of a same power domain may be compared to determine if the voltage applied on the power domain can reach the forecasted voltage $V_{exp}$ when the power domain is executing a task. In other various embodiments, other suitable methods or processes may also be used to recognize the forecasted voltage $V_{exp}$ of a power domain. For example, other quantities, obtained based on the detected voltage $V_{dect}$ and the forecasted voltage $V_{exp}$ of a power domain, may also be used for comparison and recognition processes. The specific methods for the comparison and recognition processes should not be limited by the embodiments of the present disclosure.

The distributing module 130 may also include a signal processing unit 134. The signal processing unit 134 may be connected to the recognition unit 133. Based on the result of the recognition process by the recognition unit 133, the signal processing unit 134 may determine if any operational configurations of the voltage-adjusting modules in the voltage-adjusting system 200 need to be changed or adjusted. The signal processing unit 134 may output a control signal PG to each voltage-adjusting module in the voltage-adjusting system 200. The signal processing unit 134 may be connected to the forecasting-processing unit 131 to receive the operational configurations of the voltage-adjusting modules corresponding to each power domain when the power domains are operated under the corresponding forecasted voltages $V_{exp}$.

Specifically, when the recognition unit 133 determines the detected voltage $V_{dect}$ of a power domain may reach the corresponding forecasted voltage $V_{exp}$, i.e., the operational configuration of the voltage-adjusting module corresponding to the power domain needs not be changed, the signal-processing unit 134 may output a control signal PG corresponding to the current operational configuration of the voltage-adjusting module, to the voltage-adjusting module.

When the recognition unit 133 determines the detected voltage $V_{dect}$ of a power domain is not able to reach the corresponding forecasted voltage $V_{exp}$, i.e., the operational configuration of the voltage-adjusting module corresponding to the power domain needs to be changed, the signal-processing unit 134 may obtain the operational configuration of the voltage-adjusting module corresponding to the power domain, when the power domain is operated under the corresponding forecasted voltage $V_{exp}$, from the forecasting-processing unit 131. The signal-processing unit 134 may output a control signal PG to the voltage-adjusting module to change the operational configuration of the voltage-adjusting module.

The signal-processing unit 134 may also be connected to the storage module 400. The signal-processing unit 134 may write the operational configuration, of a voltage-adjusting module, corresponding to a control signal PG, into the storage module 400.

Based on the forecasted voltages $V_{exp}$ ($V_{exp1}$, $V_{exp2}$, ..., $V_{expm}$) and the detected voltages $V_{dect}$ ($V_{dect1}$, $V_{dect2}$, ..., $V_{dectm}$), the distributing module 130 may obtain the control signals PG for the voltage-adjusting modules corresponding to the power domains through register-transfer-level codes.

The frequency, the forecasting module 120 uses to obtain the task information for each power domain in the chip and the forecasted voltage $V_{exp}$ required for each power domain to executes a task, may be the same as the frequency the distributing system 100 operates.

Referring to FIG. 3, the disclosed voltage-adjusting device may further include a voltage-adjusting system 200.

The voltage-adjusting system 200 may include one or more voltage-adjusting modules. The voltage-adjusting modules and the power domains in the chip may form one-to-one correspondence. Each voltage-adjusting module may be connected to a power domain, and vice versa. A voltage-adjusting module may include at least one power gating cell (PGC, not shown in the figures). The PGCs my function as power gatings and may reduce leakage current. By changing the on and off states of the PGCs, the voltages applied on the power domains may be controlled.

In one embodiment, a PGC may include a PMOS transistor. In other various embodiments, other suitable types and/or numbers of devices may also be used in a PGC to implement desired functions.

Specifically, the dimensions of a transistor in a PGC may be determined by the lowest power supply current to the corresponding power domain.

The ON resistance Ron of a transistor in a PGC may be associated with the source-to-drain voltage $V_{ds}$ of the transistor when the transistor is turned on. In one embodiment, the ON resistances of transistors of different dimensions, when operated under different source-to-drain voltages $V_{ds}$, may be stored in the storage module 400. In other words, the ON resistances as a function of source-to-drain voltages $V_{ds}$ may be stored in the storage module 400.

Each PGC in a voltage-adjusting module may be connected to the distributing module 130 in the distributing system 100. A control signal PG outputted by the distributing module 130 may be the switching signal for the corresponding PGCs. The switching signal may control the corresponding PGCs to be turned on and off. By changing the number of turned-on PGCs, the voltage-adjusting functions for the corresponding power domains may be obtained.

The number of PGCs in a voltage-adjusting module may be determined or adjusted based on the design requirements of the chip. Specifically, in the design and production phases, the number of PGCs in a voltage-adjusting module in the chip may be changed such that the design requirements of the power domains may be met.

Figure 7:
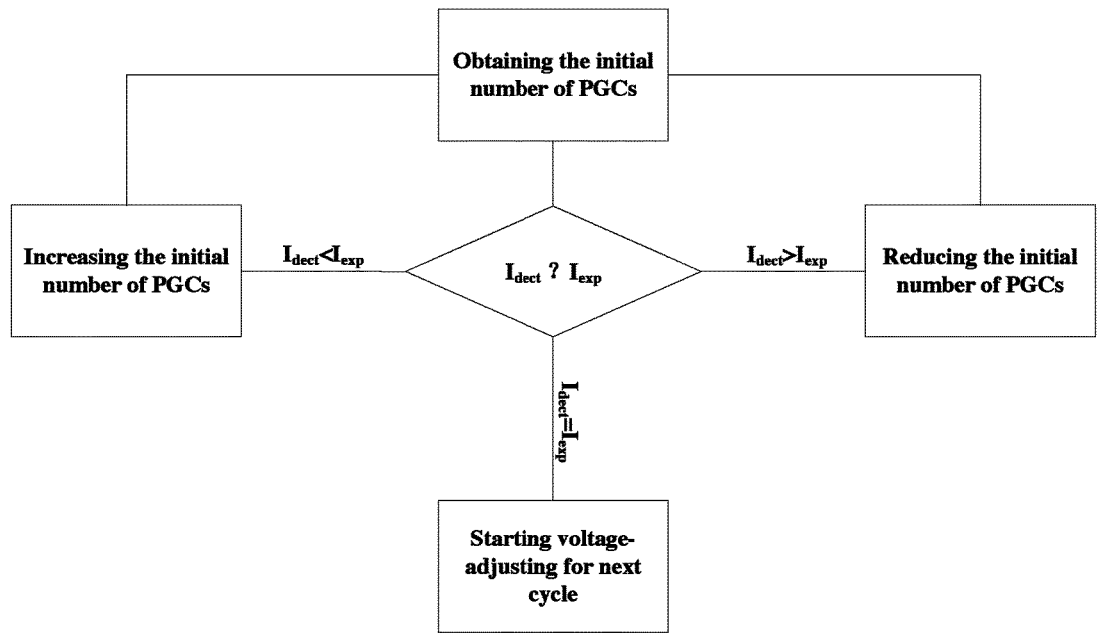
FIGS. 7-8 illustrate exemplary processes to determine a number of power gating cells in voltage-adjusting modules consistent with various disclosed embodiments of the present disclosure.
Figure 8:
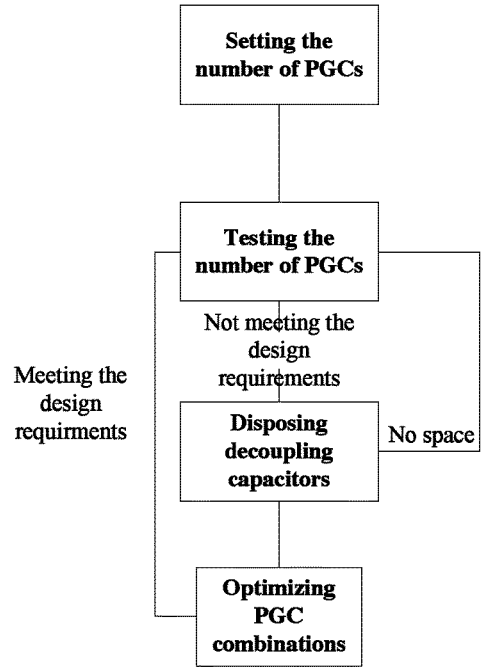

The process to determine the number of PGCs is shown in FIGS. 7 and 8. Specifically, the number of PGCs used in a voltage-adjusting module may be determined. An initial number of the PGCs refers to the number of PGCs when a PGC, operated at the maximum power supply current, includes a transistor with the smallest dimensions.

Further, according to the design requirements of the chip, the chip may be tested and the number of PGCs may be adjusted. Specifically, based on the design requirements of the chip, the chip may be tested. The chip may include the voltage-adjusting device with the initial number of PGCs. The voltage adjusting device may be used to adjust the voltages applied on the chip. That is, the voltage-adjusting device may adjust the voltages applied on the chip based on changing the number of turned-on PGCs.

When the voltage-adjusting device successfully adjusts the voltages applied on the chip/power domains, i.e., the voltage-adjusting device for the initial number of PGCs meets the design requirements of the chip and the power domains complete predetermined tasks, it may be considered that the initial number of PGCs is reasonable.

If the voltage-adjusting device fails the test, i.e., the voltage-adjusting device with the initial number of PGCs is not able to meet the design requirements of the chip and the power domains is not able to complete predetermined tasks, it may be considered that the initial number of PGCs is reasonable. In this case, the configuration of the PGC may need to be changed.

During the test, the number of PGCs in the voltage-adjusting device may be changed or adjusted to implement voltage-adjusting functions for the corresponding power domains. For example, when all the PGCs are turned on, if the forecasted current $I_{exp}$ of a power domain is still higher than the corresponding detected current $I_{dect}$, the designed voltage required for the power domain to execute a task may be considered higher than the adjusting range of the voltage-adjusting device.

That is, the design requirements of the power domain may exceed the maximum limit of the adjusting ability of the voltage-adjusting device, which may cause tasks to fail. In this case, a signal representing current overflow may be provided during the test, and the test may be ended. When all the PGCs are turned off, if the forecasted current $I_{exp}$ of a power domain is still lower than the corresponding detected current $I_{dect}$, it is considered that no control signal to control the PGCs is needed. In this case, a signal representing no needed control signal may be provided, and the test may be ended.

During the test, when a signal representing current overflow is provided, i.e., the design requirements of a power domain exceeds the maximum limit of the adjusting ability of the voltage-adjusting device, the detected capacitance $C_{dect}$ of the power domain may be considered too low. In this case, the capacitance of the decoupling capacitor arranged with the power domain may need to be increased. By adjusting the capacitance of the decoupling capacitor, the design requirements of the power domain may be reached. When there is not enough space for arranging additional decoupling capacitors or the area of the current decoupling capacitor cannot be increased, the number of PGCs may need to be increased for the design requirements of the power domain to be reached.

It should be noted that, in one embodiment, the single transistor with the smallest dimensions in a PGC in each voltage-adjusting module is only exemplary. For example, in other various embodiments, a plurality of PGCs may be arranged in a single voltage-adjusting module. Often, more PGCs may enable faster and more accurate voltage-adjusting functions, but the complexity level of the place and route (P&R) of the chip may increase. Thus, a PGC having a single transistor with the smallest dimensions may be used as the base for forming PGCs of different dimensions. PGC groups or PGC combinations of different dimensions may be formed to improve the accuracy and speed of voltage-adjusting functions and reduce the complexity level of the P&R. Specifically, in one embodiment, the PGC with the smallest dimensions, i.e., the PGC having dimensions that is one time or the same as the dimensions of the PGC with the smallest dimensions, may be used as the base for forming PGC groups or PGC combinations with different dimensions. Accordingly, the PGCs in the voltage-adjusting modules may include, a PGC having dimensions that is 2 times the dimensions of the PGC with the smallest dimensions (PGC2X), a PGC having dimensions that is 4 times the dimensions of the PGC with the smallest dimensions (PGC4X), a PGC having dimensions that is 8 times the dimensions of the PGC with the smallest dimensions (PGC8X), and so on.

Thus, a chip passing a test may indicate the voltage-adjusting ability of the voltage-adjusting device and the power domains may meet the design requirements of the chip. In some embodiments, the PGC combinations in the voltage-adjusting modules may be further optimized. For example, transistors of different dimensions may form PGCs each having dimensions that is nX times the dimensions of the PGC with the smallest dimensions (PGCnX), to replace PGCs with the smallest dimensions as the base. The complexity level of the P&R of the chip may be reduced. Codes generated in the distributing module 130 may have reduced complexity level.

Power nodes having the same forecasted voltage $V_{exp}$ may be connected together or may be distributed separately. The connection means of a power node may affect the detected capacitance $C_{dect}$ of the corresponding power domain. The connection means of the power node may also be related to the formation and capacitance of a decoupling capacitor. Thus, the connection means of the power nodes may be determined according to different embodiments.

Based on the control signals outputted by the distributing module 130, the voltage-adjusting system 200 may adjust the voltages of the corresponding power domains at the predetermined frequency. Thus, the detected voltages $V_{dect}$ of the power domains when the power domains are executing tasks may reach the forecasted voltages $V_{exp}$.

Thus, according to the present disclosure, a voltage-adjusting device may be used to implement simultaneous control of the voltages applied on a plurality of power domains in a chip. That is, one voltage-adjusting device may be configured to replace a plurality of conventional voltage-adjusting devices in conventional technology. Digital control components, occupying less areas on the chip, may be applied to implement the functions of analog feedback circuits in conventional technology. Less areas are needed for disposing the voltage-adjusting device in the chip. Further, the voltage-adjusting device may forecast the voltage required for each power domain to execute a task based on the task information for the power domains in the chip. Thus, during the design of the chip, the fluctuation range of the output voltages by the voltage-adjusting device may be obtained. In this way, less or no decoupling capacitors may be used in the chip. Areas occupied by the voltage-adjusting device on the chip may be further reduced.

In some embodiments, based on the task information of each power domain in the chip, the disclosed voltage-adjusting device may forecast the voltage required for a power domain to execute a task. In this case, lags in adjusting the voltages in the conventional technology, through feedback circuits, may be prevented. Further, because the output voltage applied on the load unit, when the power domains are executing tasks, may be forecasted, the output voltage of the disclosed voltage-adjusting device may change before the power domains start to execute tasks. Thus, large fluctuations on the output voltage of the voltage-adjusting device, caused by the power domains executing tasks, may be avoided. The output voltage of the disclosed voltage-adjusting device may be more stable.

In some embodiments, based on the task information for each power domain, the disclosed voltage-adjusting device may forecast the voltage required for a power domain to execute a task. Large fluctuations on the output voltage, caused by power domains executing different tasks, may be avoided. Less or no decoupling capacitors may be used in the chip. The disclosed voltage-adjusting device may require less power consumption.

In some embodiments, the disclosed voltage-adjusting device may obtain the detected voltages through ADC. Thus, the disclosed voltage-adjusting device may have broader voltage-adjusting range and higher voltage-adjusting accuracy. The output voltage of the disclosed voltage-adjusting device may be more stable. Further, because the input and output of the ADC may be changed, the voltage-adjusting range for a power domain, by the disclosed voltage-adjusting device, may be changed or adjusted. More operational modes may be provided by the disclosed voltage-adjusting device.

Another aspect of the present disclosure provides a voltage-adjusting method. The method may be used to adjust the voltages applied on one or more power domains.

According to the disclosed voltage-adjusting method, a detected voltage for each power domain in the chip may be obtained. The task information for each power domain in the chip may be obtained. A forecasted voltage required for each power domain in the chip to execute a task may be obtained. Based on the detected voltage and the forecasted voltage of each power domain, a control signal distributed to each power domain may be obtained. Based on the control signals, the voltages of the power domains may be adjusted such that the detected voltage of a power domain may reach the forecasted voltage of the power domain, which is required for the power domain to execute a task.

Figure 6:
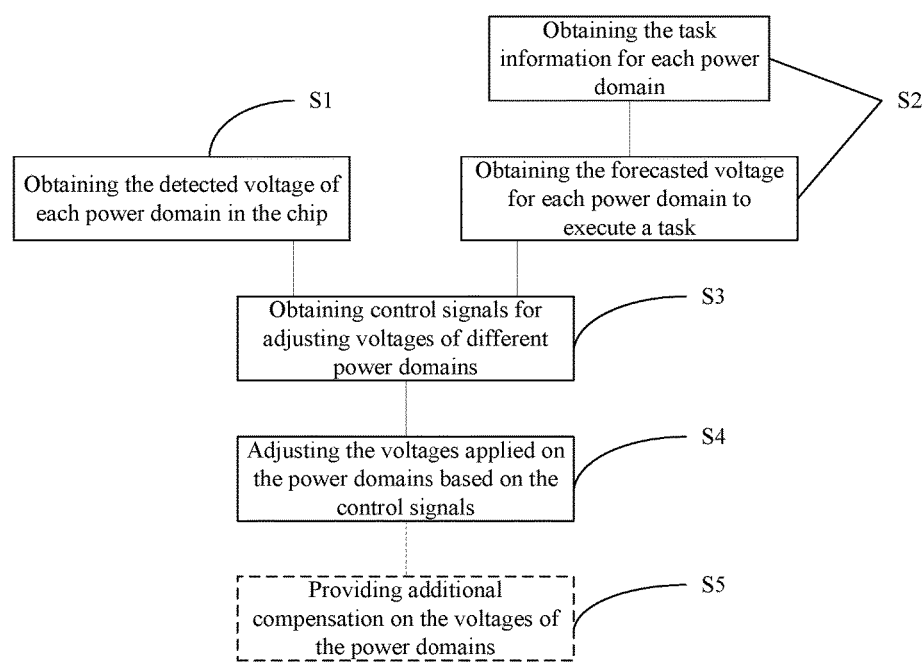
FIG. 6 illustrates an exemplary process flow of a voltage-adjusting method consistent with various disclosed embodiments of the present disclosure.

FIG. 6 illustrates an exemplary process flow of the disclosed voltage-adjusting method.

It should be noted that, in the embodiments, the chip may include one or more power domains. The chip may include a first power domain, a second power domain, . . . , and an $m^{th}$ power domain, where m represents the number of power domains in the chip.

In step S1, the detected voltage $V_{dect}$ of each power domain in the chip may be obtained.

In one embodiment, as shown in FIGS. 3 and 4, the detecting module of the disclosed voltage-adjusting device may be used to obtain the detected voltage of each power domain. Specifically, the detecting module may include a reference circuit for generating a reference voltage $V_{ref}$ and an ADC. The ADC may be connected to each power domain in the chip to receive the operational voltage of each domain. The operational voltages, outputted by the power domains and received by the ADC, may be shown as $V_1, V_2, \ldots,$ and $V_m$. The ADC may compare the operational voltages $V_1, V_2, \ldots,$ and $V_m$ with the reference voltage $V_{ref}$. The difference between an operational voltage and the reference voltage may be the detected voltage of the corresponding power domain. The detected voltages of the power domains may be $V_{dect1}, V_{dect2}, \ldots,$ and $V_{dectm}$.

The detecting module may obtain the detected voltages $V_{dect1}, V_{dect2}, \ldots,$ and $V_{dectm}$ of the power domains under a predetermined frequency.

In step S2, after obtaining the detected voltage $V_{dect}$ of each power domain, the task information for each power domain in the chip may be obtained, and a forecasted voltage $V_{exp}$ required for each power domain to execute a task may be obtained based on the corresponding task information.

In one embodiment, the forecasting module of the disclosed voltage-adjusting module may be configured to obtain the task information of each power domain. The forecasting module may obtain the forecasted voltage $V_{exp}$ required for a power domain to execute a task. Specifically, based on the task information of each power domain, the forecasting module may obtain forecasted voltages $V_{exp}$ required for different power domains to execute tasks, after k periods.

In one embodiment, system clock timing may be applied in the operations of the chip. Accordingly, a forecasted voltage $V_{exp}$ may represent the voltage required for the corresponding power domain to execute a task after k system clock cycles. Thus, forecasted voltages $V_{exp}$ after k system clock cycles for different power domains may be obtained.

In one embodiment, the chip may include m power domains. The forecasted voltages corresponding to the m forecasted voltages may be $V_{exp1}$, $V_{exp2}$, . . . , and $V_{expm}$.

Further, in one embodiment, the forecasting module may obtain the task information for each power domain in the chip according to a predetermine frequency. Further, the forecasting module may obtain the forecasted voltages of corresponding power domains.

In step S3, based on the detected voltage $V_{dect}$ and the forecasted voltage $V_{exp}$ for the same power domain, the control signal for adjusting the voltage of the power domain may be obtained.

In one embodiment, one or more voltage-adjusting modules may be used to adjust the voltage applied on the corresponding power domains. By changing the number of turned-on voltage-adjusting modules, the voltages applied on the corresponding power domains may be adjusted or changed. Specifically, the ON resistance of a voltage-adjusting module may be Ron.

The charges stored in a power domain may be described as equation (3).

$$\Delta Q = Cdect \times \Delta V = Cdect \times (Vexp - Vdect) \quad (3)$$
$$= \Delta I \times t = \left( \sum \frac{V\exp}{\text{Ron\_exp}} - \sum \frac{Vdect}{\text{Ron\_dect}} \right) \times \frac{k}{\text{f\_system}}$$

In equation (3), $C_{dect}$ may represent a detected capacitance of the power domain; $V_{exp}$ may represent the forecasted voltage of the power domain; $V_{dect}$ may represent the detected voltage of the power domain; Ron_exp may represent the ON resistance of the voltage-adjusting module corresponding to the power domain when the voltage applied on the power domain reaches the forecasted voltage $V_{exp}$; Ron_dect may represent the ON resistance of the voltage-adjusting module corresponding to the power domain when the power domain is operated under the detected voltage $V_{dect}$; f_system may represent the frequency of the system clock; k may represent k system clock cycles. The forecasted voltage $V_{exp}$, may represent the voltage required for the power domain to execute a task after k system clock cycles.

According to equation (3), when the detected voltage of a power domain reaches the forecasted voltage $V_{exp}$, the relationship among variables of a power domain may be described in equation (4).

$$\sum \frac{V\exp}{\text{Ron\_exp}} = Cdect \times \frac{V\exp - Vdect}{k/\text{f\_system}} + \sum \frac{Vdect}{\text{Ron\_dect}} \quad (4)$$

Based on the forecasted voltage $V_{exp}$ of each power domain, the operational configuration of the voltage-adjusting module corresponding to each power domain when the power domain is operated under the corresponding forecasted voltage $V_{exp}$ may be obtained. That is, the number of transistors that need to be turned on when a power domain is operated under the corresponding forecasted voltage $V_{exp}$ may be obtained. Further, based on the ON resistance Ron_exp of each voltage-adjusting module when the corresponding power domain is operated under the forecasted voltage $V_{exp}$, and the forecasted voltage $V_{exp}$ of the corresponding power domain, the forecasted current $I_{exp}$ of each power domain may be obtained. The forecasted current $I_{exp}$ may be calculated as Iexp=Σ(Vexp/Ron_exp).

Further, based on the detected voltage $V_{dect}$ of a power domain, the ON resistance Ron_dect of the corresponding voltage-adjusting module when the power domain is operated under the detected voltage $V_{dect}$, the detected capacitance $C_{dect}$ of the power domain, the operational configuration of the corresponding voltage-adjusting module when the power domain is operated under the detected voltage $V_{dect}$, and the system frequency of the chip f_system, a detected current $I_{dect}$ of the power domain may be obtained. The detected current $I_{dect}$ may be calculated as Idect= [Cdect×(Vexp−Vdect)/(k/f_system)]+Σ(Vdect/Ron_dect).

The detected capacitance $C_{dect}$ may be known in advance when the chip was designed. The operational configuration of a voltage-adjusting module refers to the number of transistors that are turned on in the voltage-adjusting module.

Further, the detected current $I_{dect}$ and the forecasted current $I_{exp}$ of each power domain may be compared. If the detected current $I_{dect}$ is equal to the forecasted current $I_{exp}$ of the same power domain, it may be determined that under the current operational configuration, the voltage-adjusting module corresponding to the power domain may reach the forecasted voltage $V_{exp}$. In this case, the operational configuration of the voltage-adjusting module does not need to be changed. The disclosed voltage-adjusting device may start the voltage-adjusting process for the next cycle.

If the detected current $I_{dect}$ is not equal to the forecasted current $I_{exp}$ of the same power domain, it may be determined that under the current operational configuration, the voltage-adjusting module corresponding to the power domain may not reach the forecasted voltage $V_{exp}$. The operational configuration of the voltage-adjusting module may need to be changed. When the detected current $I_{dect}$ is lower than the forecasted current $I_{exp}$, the detected voltage $V_{dect}$ may be lower than the forecasted voltage $V_{exp}$ of the same power domain. In this case, more transistors in the corresponding voltage-adjusting module may need to be turned on. When the detected current $I_{dect}$ is higher than the forecasted current $I_{exp}$ of the same power domain, the detected voltage $V_{dect}$ may be higher than the forecasted voltage $V_{exp}$. In this case, the number of turned-on transistors in the corresponding voltage-adjusting module may need to be reduced.

In step S4, based on the control signals, the voltage applied on each power domain may be adjusted.

In some embodiments, when the voltage-adjusting functions cannot be applied on the power domains, step S5 may be performed. By applying additional compensation on the voltages of the power domains, the detected voltages of the power domains may reach the corresponding forecasted voltages when the power domains are executing a task. Specifically, in one embodiment, decoupling capacitors may be used to provide additional compensation to the power domains. The dash line of step S5 in FIG. 6 indicates that step S5 may be optional.

It should be noted that, the steps to obtain the task information for each power domain in the chip and obtain the forecasted voltages of the power domains may include obtaining the task information for each power domain at a predetermined frequency to determine the forecasted voltage of each power domain, where the forecasted voltage of a power domain represents the voltage required for the power domain to execute a task. The steps to obtain the detected voltage of each power domain may include obtaining the detected voltage of each power domain in the chip at the predetermined frequency. Based on the forecasted voltage and the detected voltage of a same power domain, the steps to obtain the control signal for each power domain may include obtaining the control signal distributed to each power domain at the predetermined frequency.

Thus, according to the disclosed voltage-adjusting method, the voltage required for a power domain to execute a task may be forecasted based on the task information of each power domain. Lags in adjusting the voltages of the power domains through feedback circuits may be avoided. Because the voltage-adjusting device may forecast the change of tasks executed by the power domains, the output voltage of the voltage-adjusting device may change before the tasks, executed by the power domains, change. Thus, the output voltage of the voltage-adjusting device may be less susceptible to large fluctuations caused by the change of tasks, which are executed by the power domains. The output voltage of the disclosed voltage-adjusting device may be more stable.

Compared to conventional technology, the disclosed voltage-adjusting device has several advantages. The voltage-adjusting device may be used to implement simultaneous control of the voltages applied on a plurality of power domains in a chip. That is, one voltage-adjusting device may be configured to replace a plurality of conventional voltage-adjusting devices in conventional technology. Digital control components, occupying less areas on the chip, may be applied to implement the functions of analog feedback circuits in conventional technology. Less areas are needed for disposing the voltage-adjusting device in the chip. Further, the voltage-adjusting device may forecast the voltage required for each power domain to execute a task based on the task information for the power domains in the chip. Thus, during the design of the chip, the fluctuation range of the output voltages by the voltage-adjusting device may be obtained. In this way, less or no decoupling capacitors may be used in the chip. Areas occupied by the voltage-adjusting device on the chip may be further reduced.

Further, in some embodiments, based on the task information of each power domain in the chip, the disclosed voltage-adjusting device may forecast the voltage required for a power domain to execute a task. In this case, lags in adjusting the voltages in the conventional technology, through feedback circuits, may be prevented. Further, because the output voltage applied on the load unit, when the power domains are executing tasks, may be forecasted, the output voltage of the disclosed voltage-adjusting device may change before the power domains start to execute tasks. Thus, large fluctuations on the output voltage of the voltage-adjusting device, caused by the power domains executing tasks, may be avoided. The output voltage of the disclosed voltage-adjusting device may be more stable.

Further, in some embodiments, based on the task information for each power domain, the disclosed voltage-adjusting device may forecast the voltage required for a power domain to execute a task. Large fluctuations on the output voltage, caused by power domains executing different tasks, may be avoided. Less or no decoupling capacitors may be used in the chip. The disclosed voltage-adjusting device may require less power consumption.

Further, in some embodiments, the disclosed voltage-adjusting device may obtain the detected voltages through ADC. Thus, the disclosed voltage-adjusting device may have broader voltage-adjusting range and higher voltage-adjusting accuracy. The output voltage of the disclosed voltage-adjusting device may be more stable. Further, because the input and output of the ADC may be changed, the voltage-adjusting range for a power domain, by the disclosed voltage-adjusting device, may be changed or adjusted. More operational modes may be provided by the disclosed voltage-adjusting device.

Further, the voltage required for a power domain to execute a task may be forecasted based on the task information of each power domain. Lags in adjusting the voltages of the power domains through feedback circuits may be avoided. Because the voltage-adjusting device may forecast the change of tasks executed by the power domains, the output voltage of the voltage-adjusting device may change before the tasks, executed by the power domains, change. Thus, the output voltage of the voltage-adjusting device may be less susceptible to large fluctuations caused by the change of tasks, which are executed by the power domains. The output voltage of the disclosed voltage-adjusting device may be more stable.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A voltage-adjusting device for adjusting voltages of one or more power domains in a chip, comprising:
 a distributing system including a detecting module, a forecasting module, and a distributing module, and
 a voltage-adjusting system, wherein:
 the distributing system obtains a task information for the one or more power domains, the forecasting module obtains a forecasted voltage for the power domain based on the task information, the detecting module obtains a detected voltage for a power domain, and the distributing module obtains a control signal for the power domain for controlling a voltage applied on the power domain based on the forecasted voltage and the detected voltage, the forecasted voltage being a voltage required for the power domain to execute a task; and
 the voltage-adjusting system, connected to the distributing system and the one or more power domains, adjusts the voltage applied on the power domain based on the control signal such that the detected voltage reaches the forecasted voltage when the power domain executes a task.

2. The voltage-adjusting device according to claim 1, wherein the detecting module detects an operational voltage of the power domain and generates the detected voltage based on the operational voltage.

3. The voltage-adjusting device according to claim 2, wherein:
 the detecting module comprises a reference circuit and an analog-to-digital converter (ADC);
 the reference circuit generates a reference voltage;

the ADC, connected to the reference circuit and the power domain, compares the operational voltage of the power domain with the reference voltage to generate the detected voltage of the power domain, the detected voltage being a digital signal.

4. The voltage-adjusting device according to claim 3, wherein the reference circuit is a bandgap voltage reference circuit.

5. The voltage-adjusting device according to claim 3, wherein the ADC is a successive approximation register (SAR) ADC.

6. The voltage-adjusting device according to claim 1, further comprising a processing module for controlling operations of the voltage-adjusting device.

7. The voltage-adjusting device according to claim 6, wherein the forecasting module is connected to the processing module to obtain task information of the one or more power domains and generate the forecasted voltage of the power domain based on the task information.

8. The voltage-adjusting device according to claim 1, wherein:
the voltage-adjusting system comprises one or more voltage-adjusting modules; and
the one or more voltage-adjusting modules form one-to-one connection with the one or more power domains and adjust voltages applied on the one or more power domains based on the control signals, such that the detected voltage applied on a power domain reaches the forecasted voltage when the power domain executes a task.

9. The voltage-adjusting device according to claim 8, wherein
a voltage-adjusting module of the one or more voltage-adjusting modules comprises one or more power gating cells (PGC), each power gating cell including one or more transistors connected to a corresponding power domain; and
based on the control signal, the one or more transistors in the voltage-adjusting module are turned on or off to adjust the voltage applied on the corresponding power domain.

10. The voltage-adjusting device according to claim 9, wherein smallest dimensions of a transistor of the one or more transistors are determined based on a smallest power supply current provided to the corresponding power domain.

11. The voltage-adjusting device according to claim 10, wherein:
a base PGC is one of the one or more PGCs having only one transistor with the smallest dimensions; and
dimensions of each of the PGC being a multiple of the dimensions of the base PGC.

12. The voltage-adjusting device according to claim 9, further comprising decoupling capacitors connected to corresponding power domains, wherein:
when the PGCs are turned on and the detected voltage of a power domain is different from the forecasted voltage, the decoupling capacitors compensate the voltages applied on the power domain so that the detected voltage reaches the forecasted voltage when the power domain executes a task.

13. The voltage-adjusting device according to claim 9, further comprising a storage module configured to store ON resistances of transistors of different dimensions under different source-to-drain voltages, detected capacitances of the one or more power domains, a system frequency of the chip, and operational configurations of the transistors in the voltage-adjusting module.

14. The voltage-adjusting device according to claim 13, wherein the operation configuration of a transistor of the one or more transistors includes on and off states of the transistor.

15. The voltage-adjusting device according to claim 14, the distributing module comprising a detecting-processing unit, a forecasting-processing unit, a recognition unit, and a signal-processing unit, wherein:
the forecasting-processing unit, connected to the storage module, obtains the operational configuration of the voltage-adjusting module based on the forecasted voltage of a corresponding power domain, and obtains a forecasted current of the corresponding power domain based on the forecasted voltage and the ON resistances of the transistors in the voltage-adjusting module;
the detecting-processing unit, connected to the storage module, obtains a detected current of the corresponding power domain based on the detected capacitance of the power domain, the forecasted voltage of the power domain, the detected voltage of the power domain, the system frequency, and the ON resistance and the operational configuration of the corresponding voltage-adjusting module;
the recognition unit determines if the detected voltage of the corresponding power domain equals the forecasted voltage of the corresponding power domain based on the forecasted current and the detected current of the corresponding power domain; and
the signal-processing unit, connected to the recognition unit and the forecasting-processing unit, when the recognition unit determines the detected voltage of the corresponding power domain is different from the forecasted voltage of the corresponding power domain, obtains and outputs the control signal for adjusting the voltage applied on the corresponding power domain based on the forecasted current.

16. The voltage-adjusting device according to claim 15, wherein:
the distributing system obtains the task information and forecasted voltages of the one or more power domains at a predetermined frequency;
the distributing system obtains the detected voltages of the one or more power domains at the predetermined frequency;
the distributing system obtains the control signals for the one or more power domains based on the forecasted voltages and the detected voltages of the one or more power domains at the predetermined frequency;
the voltage-adjusting system adjusts the voltages applied on the one or more power domains based on the control signals at the predetermined frequency such that the detected voltages of the one or more power domains reach the forecasted voltages of the one or more power domains when the power domains execute tasks.

17. A voltage-adjusting method for adjusting voltages applied on a plurality of power domains in a chip, comprising:
obtaining a detected voltage of a power domain at a predetermined frequency;
obtaining task information of the plurality power domains at the predetermined frequency to obtain a forecasted voltage of the power domain, the forecasted voltage being a voltage required for the power domain to execute a task;

obtaining a control signal for the power domain at the predetermined frequency based on the detected voltage and the forecasted voltage; and adjusting the voltage applied on the power domain based on the control signal such that the detected voltage reaches the forecasted voltage when the power domain executes a task.

18. The voltage-adjusting method according to claim 17, further comprising additional compensation to the voltage applied on the power domain such that the detected voltage reaches the forecasted voltage when the power domain executes a task.

19. A voltage-adjusting device for adjusting voltages of one or more power domains in a chip, comprising:
- a distributing system including a detecting module, a forecasting module, and a distributing module, and
- a voltage-adjusting system connected to the distributing system, wherein:

the distributing system obtains a task information for the one or more power domains at a predetermined frequency, the forecasting module obtains a forecasted voltage for the power domain based on the task information, the detecting module obtains a detected voltage for a power domain at a predetermined frequency, and the distributing module obtains a control signal for the power domain at a predetermined frequency for controlling a voltage applied on the power domain based on the forecasted voltage and the detected voltage, the forecasted voltage being a voltage required for the power domain to execute a task.

20. The voltage-adjusting device according to claim 19, wherein the voltage-adjusting system is connected to the one or more power domains, and adjusts the voltage applied on the power domain based on the control signal such that the detected voltage reaches the forecasted voltage when the power domain executes a task.

* * * * *